Patented May 17, 1949

2,470,269

UNITED STATES PATENT OFFICE 2,470,269

FRICTION MATERIAL

Ralph Schaefer, Cleveland, Ohio, assignor to The Cleveland Graphite Bronze Company, Cleveland, Ohio, a corporation of Ohio No Drawing. Application August 13, 1945, Serial No. 610,663

2 Claims. (Cl. 29—192)

The present invention, relating as indicated to friction material, is more particularly directed to an improved composite friction material or member to be used in such elements as clutches and/or brakes to engage a metallic member in order to decrease in part or in whole the motion of a rotating member. The principal object of the invention is the provision of such a material or member with a relatively high coefficient of friction and with superior operating qualities, such as smoothness of engagement or operation, long life in use and consistency of friction after repeated engagements or use.

A further object of the invention is the provision of such a material or element composed of powdered metals and oxides of the elements of aluminum, silicon, calcium and iron, the oxides being of definite size and shape resulting from certain known processes which will be subsequently described.

To the accomplishment of the foregoing and related ends, said invention, then, consists of the means hereinafter described and particularly pointed out in the claims; the following description setting forth in detail one method and one product constituting, however, but one of various applications of the principle of my invention.

Friction materials or members composed of metal powders such as copper, lead and/or tin, together with a suitable friction material compressed under heavy pressure and subsequently sintered at temperatures sufficient to bind the mass together, have been known and have been in use for some time. Such materials have usually been made by incorporating graphite and other materials such as silica and asbestos to control the coefficient of friction of the resulting material. Such materials have been fairly satisfactory in use but have not had a sufficiently high coefficient of friction and there has been a constant demand for a friction material of the type described with a higher coefficient of friction and one in which a high coefficient of friction will be maintained throughout the life of the material with a minimum of wear. There has also been a demand for material of this type which has the necessary strength and continuous smooth operating qualities for satisfactory service under severe conditions and while it has been possible to increase the coefficient of friction either by changing the friction material incorporated in the mass or by increasing the amount of friction material, heretofore the result has been either to weaken the mass considerably; to cause sharp engagement or grabbing during operation which ultimately results in failure, or to cause excessive wear of the friction element and also of the cooperating metallic member.

The present invention consists of a new combination of materials which gives both a higher coefficient of friction and longer life with smooth and continuous satisfactory operation and a method of making the same. The composition itself consists of metal powders such as copper, tin and/or lead, with or without graphite, and oxides of the elements of aluminum, silicon, calcium and iron, in which the latter ingredients have the shape and size imparted to them by the method of manufacture hereinafter explained. Numerous tests have shown that this material gives a higher coefficient of friction for a given amount of wear than it has been possible to obtain with prior friction materials, and at the same time holds the wear of the friction material and of the cooperating metallic element to a minimum. The smoothness of operation, that is, engagement of the friction material and the cooperating metallic element, is also improved, since there is but slight tendency for the friction member to stick to the cooperating metallic element during operating, even at elevated temperature.

My improved friction material may have the ingredients comprising the same, varied for different operating conditions within considerable limits, as will be readily understood, but one which has been proven especially satisfactory consists of 50–70% copper powder, 2–6% tin powder, 5–10% lead powder, 5–10% graphite and 10–30% of the oxides of the elements aluminum, silicon, calcium and iron, compressed and sintered together into a unitary mass. This oxide component of the composition is approximately 10 to 25% aluminum oxide, 25 to 50% silica, 15 to 25% calcium oxide and 10 to 30% iron oxide. Other oxides in small amounts constitute the balance. All of the oxides just stated are in a finely divided form and of a size distribution as follows: In a standard screen analysis test, 0 to 20% of the material is entrapped on an 80 mesh screen; 0 to 20% on a 100 mesh screen; 5 to 20% on a 150 mesh screen; 5 to 20% on a 200 mesh screen; 5 to 15% on a 270 mesh screen; 5 to 20% on a 325 mesh screen; and 10 to 40% will pass through the 325 mesh screen. From this analysis, it can be seen that the material is not uniform as to size but varies over a range of sizes. It is felt that this irregularity of size aids materially in giving the desired friction results to the finished member.

The specific gravity of the oxide component is between .8 and 1.1 in its original condition, and the particle shape is irregular.

In the manufacture of my improved material into members or articles for frictional use, that is, brake or clutch parts, various ingredients, all in a relatively finely divided condition, are thoroughly intermixed with each other and then placed in a mold of the desired shape and pressed to the desired size, the pressure varying with the desired density of the pressed material. This preliminarily formed article is then placed in the furnace and heat-treated in a reducing atmosphere to produce sintering of the metal powder present, thus bonding the entire mass together. The particles have been subjected to sufficient pressure in the preliminary forming operation so that there is slight tendency for the oxides to become reduced during the sintering operation. During the sintering operation, the pressed member or material may, if desired, be sintered as a single unit or it may be placed under pressure against a backing member or plate, usually of steel, in which case the sintering operation will cause not only the bonding of the particles of the mass together, but the bonding of the material or member to the backing plate at the same time.

I am unable to prove an explanation of the properties in the oxides employed which control the quality as regards friction, life, etc. of the finished sintered material or member, but believe that the most important factor is the shape and size of the particles of these oxides, and that this, in turn, is controlled by the method used in producing these oxides. One way of producing the oxides referred to in a condition adapting them for use in my improved friction material is by sedimentation or chemical precipitation and ignition of the sludge produced by the practices now being carried out in many municipal sewage disposal plants. In the treatment of ordinary sewage, the object is to collect the colloidal organic matter and suspended material which is present and also to form insoluble salts of the inorganic material, which consists of compounds of the elements above named. Although there are various processes in use, the sludge produced by the activated sludge method and the chemical precipitation method is essentially the same. During the sewage treatment process, chemicals are added to the sewage to increase the rate of sedimentation and thus speed up the process. The actual mechanics of precipitation are, on the whole, very complex, but the following quotation gives a description which is generally accepted. In "American Sewage Practice" by Metcalf and Eddy, vol. 3, page 348, the following appears: "—with the knowledge now available, precipitation reactions may be ascribed to the following properties of the precipitant, which it may possess in part or as a whole: The formation by chemical reaction of insoluble or very slightly soluble precipitates, which in a mechanical way enmesh suspended matter and carry them down; adsorption of dissolved or colloidal matter on the large surfaces presented by the precipitate—."

The precipitated sludge is then filtered, dried and ignited in the presence of an excess amount of air with the result that the oxides of the elements above-named are formed in a finely divided condition with irregular shape, making said oxides suitable for use as a friction agent when used in combination with powdered metals as previously described.

The oxides formed upon the incineration of sewage sludge will vary slightly in different localities and in different seasons but we have found that these variations do not materially effect the frictional properties of the oxides.

A specific composition used very successfully for clutch plate purposes consists of approximately 67% copper powder, 7% lead powder, 5% tin powder, 7% graphite and 14% of the oxides formed from the incineration of sewage sludge. Another very successful composition consists of approximately 67% copper powder, 2% tin powder, 6% lead powder, 7% graphite and 20% of the oxides formed from the incineration of sewage sludge.

This application represents a continuation-in-part of my copending application Serial No. 366,916, now abandoned.

Other modes of applying the principle of my invention may be employed instead of the one explained, change being made as regards the product and method herein disclosed, provided the step or steps stated by any of the following claims or the equivalent of such stated step or steps be employed.

I, therefore, particularly point out and distinctly claim as my invention:

1. A friction material consisting of a mixture of metal powder of which the principal ingredient is copper and the oxides of aluminum, silicon, calcium, and iron compressed and sintered together into a unitary mass, the percentage of copper being 50% to 70% and the oxide component being 10% to 25% aluminum oxide, 25% to 50% silica oxide, 15% to 25% calcium oxide, and 10% to 30% iron oxide.

2. A friction material consisting of a mixture of metal powder of which the principal ingredient is copper and the oxides of aluminum, silicon, calcium, and iron compressed and sintered together into a unitary mass, the percentage of copper being 50% to 70% and the oxide component being 10% to 25% aluminum oxide, 25% to 50% silica oxide, 15% to 25% calcium oxide, and 10% to 30% iron oxide, and the size of the particles of the oxides ranging from zero to 20% entrapped on an 80 mesh screen, zero to 20% entrapped on a 100 mesh screen, 5% to 20% entrapped on a 150 mesh screen, 5% to 20% entrapped on a 200 mesh screen, 5% to 15% entrapped on a 270 mesh screen, 5% to 20% entrapped on a 325 mesh screen, and 10% to 40% passing through the 325 mesh screen.

RALPH SCHAEFER.

REFERENCES CITED

The following references are of record in the file of this patent:

UNITED STATES PATENTS

| Number | Name | Date |
| --- | --- | --- |
| 2,072,070 | Fisher | Feb. 23, 1937 |
| 2,178,527 | Wellman | Oct. 31, 1939 |
| 2,239,134 | Wellman | Apr. 22, 1941 |

FOREIGN PATENTS

| Number | Country | Date |
| --- | --- | --- |
| 187,969 | Sweden | Feb. 16, 1937 |
| 244,358 | Great Britain | Dec. 17, 1925 |
| 588,965 | France | May 18, 1925 |

OTHER REFERENCES

Page 212, The Making, Shaping and Treating of Steel, by C. B. Francis and J. M. Camp, 5th ed. (2nd impression), 1940, pub. by Carnegie-Ill. Steel Corp., Pittsburgh, Pa.